(12) United States Patent
Jo et al.

(10) Patent No.: US 12,518,647 B2
(45) Date of Patent: Jan. 6, 2026

(54) ELECTRONIC DEVICE, SERVER, AND METHOD FOR XR-BASED ANIMAL EXPERIMENT EDUCATION

(71) Applicants: THE CATHOLIC UNIVERSITY OF KOREA INDUSTRY-ACADEMIC COOPERATION FOUNDATION, Seoul (KR); RaonMeta Co., Ltd., Seoul (KR)

(72) Inventors: Hyunmu Jo, Goyang-si (KR); Jae Yeon Choe, Goyang-si (KR); Soon Hyung Lee, Seoul (KR); Jung A Lee, Seoul (KR); Won Seok Yoon, Yongin-si (KR); Dae Young Kim, Bucheon-si (KR)

(73) Assignees: THE CATHOLIC UNIVERSITY OF KOREA INDUSTRY-ACADEMIC COOPERATION FOUNDATION, Seoul (KR); RaonMeta Co., Ltd., Seoul (KR)

( * ) Notice: Subject to any disclaimer, the term of this patent is extended or adjusted under 35 U.S.C. 154(b) by 0 days.

(21) Appl. No.: 18/789,353

(22) Filed: Jul. 30, 2024

(65) Prior Publication Data

US 2025/0299589 A1    Sep. 25, 2025

(30) Foreign Application Priority Data

Mar. 25, 2024  (KR) ........................ 10-2024-0040314
Apr. 19, 2024  (KR) ........................ 10-2024-0052557

(51) Int. Cl.
*G09B 5/02*     (2006.01)
*G06V 20/20*    (2022.01)
*G06V 40/20*    (2022.01)

(52) U.S. Cl.
CPC ............... *G09B 5/02* (2013.01); *G06V 20/20* (2022.01); *G06V 40/20* (2022.01)

(58) Field of Classification Search
CPC . G09B 9/00; G09B 5/02; G09B 23/00; G09B 23/28; G09B 23/30; G09B 23/36
See application file for complete search history.

(56) References Cited

U.S. PATENT DOCUMENTS

2017/0213473 A1*   7/2017  Ribeira .................... G06T 19/00
2019/0340956 A1*  11/2019  Lindkvist ............. G09B 23/285
(Continued)

FOREIGN PATENT DOCUMENTS

CN    116682301 A    9/2023
JP    2021-152636 A  9/2021
(Continued)

OTHER PUBLICATIONS

Screen Captures from Youtube Video uploaded by user VictoryXR. Video entitled "Virtual Reality Animal Dissection Demo", published by VictoryXR, 5 pages, uploaded Aug. 14, 2018. (Year: 2018).*

(Continued)

*Primary Examiner* — Kang Hu
*Assistant Examiner* — Correll T French
(74) *Attorney, Agent, or Firm* — Studebaker Brackett PLLC

(57) ABSTRACT

Disclosed are an electronic device, a server, and a method for XR-based animal experiment education, in which practice effects corresponding to the practice movement of a user in an XR image are given and displayed, thereby providing realistic practice education effects.

13 Claims, 10 Drawing Sheets

(56) References Cited

U.S. PATENT DOCUMENTS

2022/0113804 A1* 4/2022 Crowther ............... A61B 34/10
2022/0375620 A1* 11/2022 Scheib ................... G16H 40/67

FOREIGN PATENT DOCUMENTS

JP       2023-512458 A    3/2023
KR   10-2021-0022135 A    3/2021

OTHER PUBLICATIONS

An Office Action; mailed by the Korean Intellectual Property Office on Jun. 10, 2024, which corresponds to Korean Patent Application No. 10-2024-0052557.

\* cited by examiner

FIG. 4
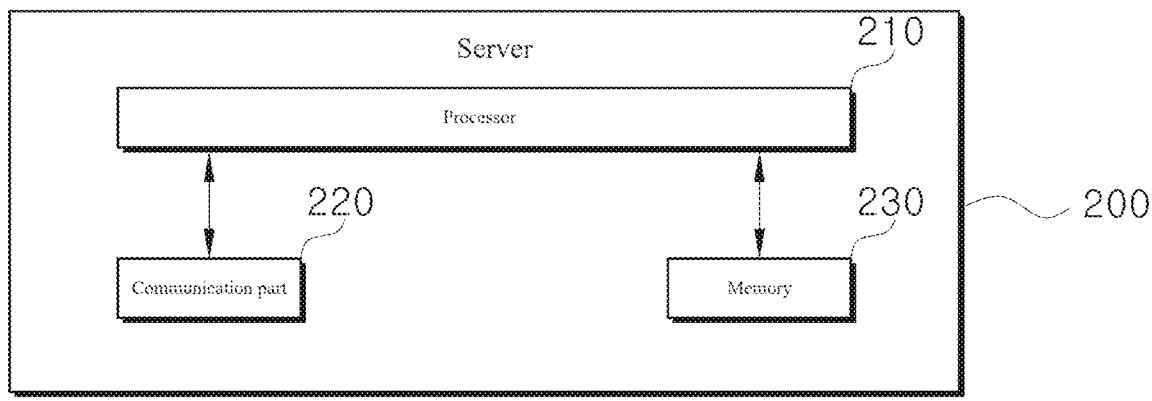
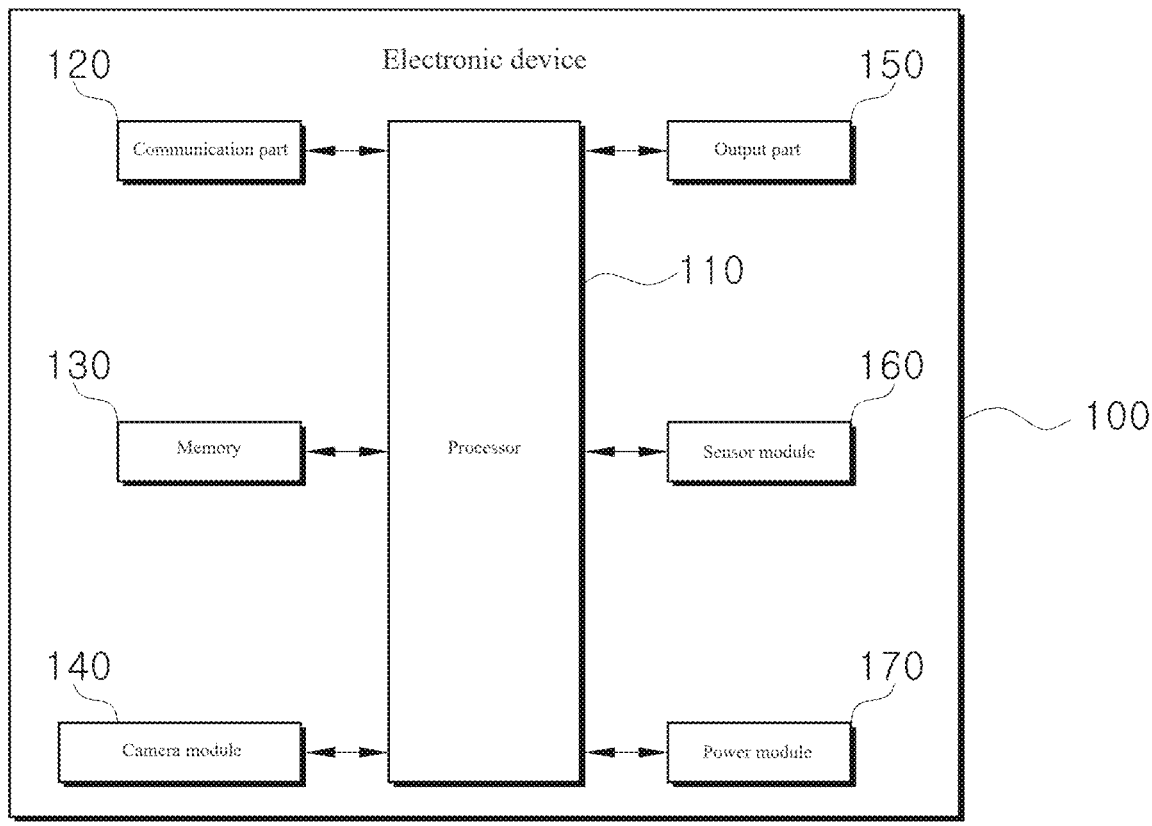

ELECTRONIC DEVICE, SERVER, AND METHOD FOR XR-BASED ANIMAL EXPERIMENT EDUCATION

CROSS-REFERENCE TO RELATED APPLICATIONS

A claim for priority under 35 U.S.C. § 119 is made to Korean Patent Application Nos. 10-2024-0040314 filed on Mar. 25, 2024 and 10-2024-0052557 filed on Apr. 19, 2024 in the Korean Intellectual Property Office, the entire contents of which are hereby incorporated by reference.

BACKGROUND

Embodiments of the present disclosure described herein relate to an electronic device for animal experiment education, and more particularly, relate to an electronic device that provides XR-based animal experiment education.

An animal experiment is a very important part in various fields of scientific research.

The animal experiment is used to obtain experimental data required in various fields, such as evaluating the safety and effectiveness of new drugs, understanding disease mechanisms, and developing medical treatment methods.

However, an animal experiment has various problems, including controversy, along with ethical concerns about the benefit and mistreatment of animals.

Accordingly, there is a need for technology that is able to solve these problems by applying virtual reality technology, which has recently been applied in various fields, to the field of an animal experiment, but currently, such technology is not disclosed.

SUMMARY

Embodiments of the present disclosure provide an XR-based animal experiment education device.

Problems to be solved by the present disclosure are not limited to the problems mentioned above, and other problems not mentioned may be clearly understood by those skilled in the art from the description below.

According to an embodiment of the present disclosure to solve the above-described problems, an electronic device includes a camera module, a display module that includes at least one display that displays extended reality (XR) images, a memory that stores one or more XR images for virtual practice of an animal experiment, and reference practice information including order of each of practice movements included in each education course for the virtual practice and a normal movement range for each of the practice movements, and a processor that displays a specific XR image corresponding to an education course of a user among the one or more XR images on the display module and recognizes a practice movement of the user on a basis of a practice image including the practice movement of the user performed on an experimental subject in the specific XR image when the practice image is received from the camera module, wherein the processor may give and display at least one practice effect corresponding to the recognized practice movement in the specific XR image, and evaluate practice education of the user on a basis of the recognized practice movement during the corresponding education course.

In addition, according to an embodiment of the present disclosure to solve the above-described problems, a server that provides animal experiment practice service by an XR device includes a memory that stores one or more XR images for virtual practice of an animal experiment, and reference practice information including order of each of practice movements included in each education course for the virtual practice and a normal movement range for each of the practice movements, and a processor that displays a specific XR image corresponding to an education course of a user among the one or more XR images on a display module and recognizes a practice movement of the user on a basis of a practice image including the practice movement of the user performed on an experimental subject in the specific XR image when the practice image is received from a camera module, wherein the processor may give and display at least one practice effect corresponding to the recognized practice movement in the specific XR image, and evaluate practice education of the user on a basis of the recognized practice movement during the corresponding education course.

In addition, according to an embodiment of the present disclosure to solve the above-described problems, a control method of an electronic device for XR-based animal experiment education as a method performed by a computing device includes displaying a specific XR image corresponding to an education course of a user on a display module, receiving a practice image captured to include a practice movement of the user performed on an experimental subject in the specific XR image, recognizing the practice movement of the user on a basis of the received practice image, giving and displaying at least one practice effect corresponding to the recognized practice movement in the specific XR image, and evaluating practice education of the user on a basis of the recognized practice movement during the corresponding education course, wherein the computing device stores one or more extended reality images for virtual practice of an animal experiment, and reference practice information including order of each of practice movements included in each education course for the virtual practice and a normal movement range for each of the practice movements.

In addition, a computer program stored in a computer-readable recording medium for execution to implement the present disclosure may be further provided.

In addition, a computer-readable recording medium recording a computer program for executing a method for implementing the present disclosure may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 3 and 4 are block diagrams of the XR-based animal experiment education system according to an embodiment of the present disclosure;

DETAILED DESCRIPTION

Figure 1:
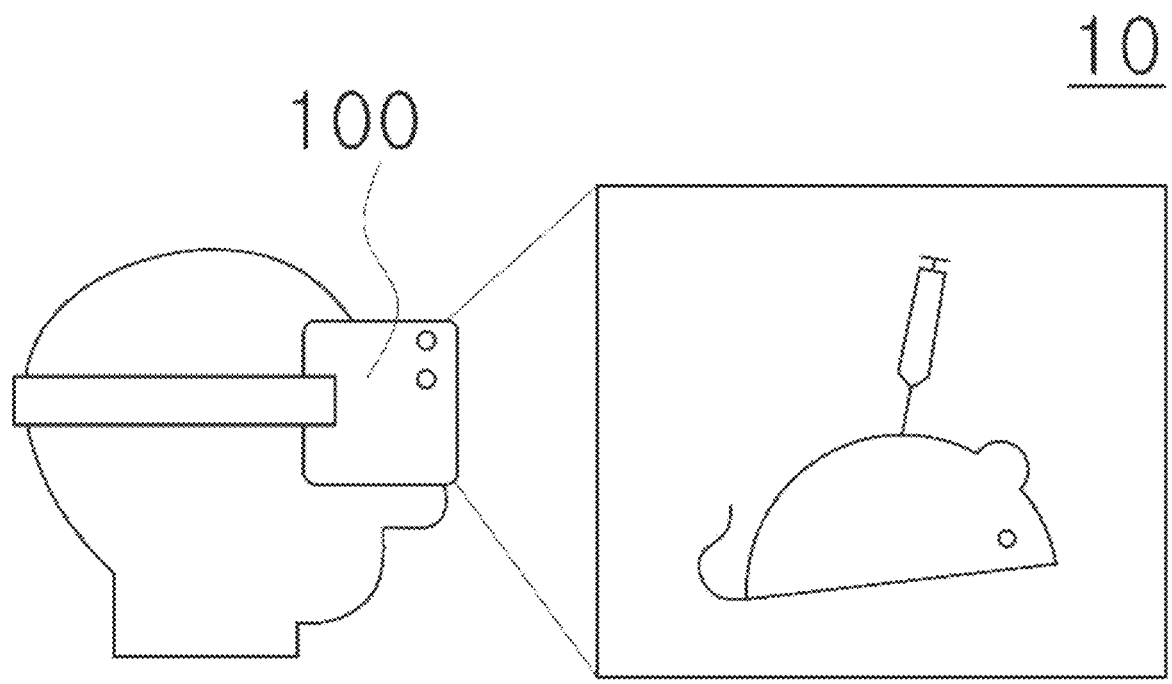
FIGS. 1 and 2 are schematic diagrams of an XR-based animal experiment education system according to an embodiment of the present disclosure.

Like reference numerals refer to like elements throughout the present disclosure. The present disclosure does not describe all elements of the embodiments, and general contents or overlapping contents between embodiments in the art to which the present disclosure belongs are omitted. The term 'part, module, member, or block' used in the specification may be implemented as software or hardware, and depending on embodiments, a plurality of 'parts, modules, members, or blocks' may be implemented as a single component, or it is also possible for one 'part, module, member, or block' to include a plurality of components.

Throughout the specification, when a part is described to be "connected" to another part, this includes not only direct connection to each other but also indirect connection to each other, and the indirect connection includes connection through a wireless communication network.

Additionally, when a part "includes" a certain component, this means that the part may further include other components rather than excluding the other components unless specifically stated to the contrary.

Throughout the specification, when a first member is described to be located "on" a second member, this includes not only a case where the first member is in contact with the second member, but also a case where a third member is present between the first member and the second member.

Terms such as first, second, etc. are used to distinguish one component from another component, and the components are not limited by the above-mentioned terms.

Singular expressions include plural expressions unless the context clearly makes an exception.

An identification code for each stage is used for convenience of explanation. The identification code does not explain the order of each stage, and each stage may be performed differently from specified order unless a specific order is clearly stated in the context.

Hereinafter, the operating principle and embodiments of the present disclosure will be described with reference to the accompanying drawings.

In this specification, "an electronic device according to the present disclosure" includes all various devices that are able to perform computational processing and provide results to a user. For example, the electronic device according to the present disclosure may include a computer, a server device, and a portable terminal, or may be in the form of any one thereof.

Here, the computer may, for example, include a notebook, a desktop, a laptop, a tablet PC, a slate PC, etc. equipped with a web browser.

The server device is a server that processes information by communicating with external devices, and may include an application server, a computing server, a database server, a file server, a game server, a mail server, a proxy server, and a web server, etc.

For example, the portable terminal, which is a wireless communication device that guarantees portability and mobility, may include all types of handheld wireless communication devices such as PCS, GSM, personal digital cellular (PDC), a personal handyphone system (PHS), a personal digital assistant (PDA), international mobile telecommunication (IMT)-2000, code division multiple access (CDMA)-2000, W-code division multiple access (W-CDMA), a wireless broadband internet (WiBro) terminal, smart phone, etc., and wearable devices such as a watch, a ring, a bracelet, an anklet, a necklace, a glasses, a contact lens, or a head-mounted device (HMD), etc.

A function related to artificial intelligence according to the present disclosure is operated through a processor and memory. The processor may consist of one processor or a plurality of processors. In this case, one processor or a plurality of processors may be a general-purpose processor such as a CPU, AP, and a digital signal processor (DSP), a graphics-specific processor such as a GPU and a vision processing unit (VPU), or an artificial intelligence-specific processor such as an NPU. One processor or more processors control input data to be processed according to a predefined operation rule stored in memory or an artificial intelligence model. Alternatively, when one processor or a plurality of processors is an artificial intelligence-specific processor, the artificial intelligence-specific processor may be designed as a hardware structure specialized for processing a specific artificial intelligence model.

A predefined operation rule or an artificial intelligence model is characterized by being created through learning. Here, being created through learning means that a basic artificial intelligence model learns by using multiple learning data by a learning algorithm, thereby creating a predefined operation rule or an artificial intelligence model set to perform desired characteristics (or a purpose). This learning may be performed in the device itself that performs artificial intelligence according to the present disclosure, or may be performed through a separate server and/or a system. Examples of learning algorithms include supervised learning, unsupervised learning, semi-supervised learning, or reinforcement learning, but are not limited to the examples described above.

An artificial intelligence model may be composed of a plurality of neural network layers. Each of the plurality of neural network layers has a plurality of weights, and neural network calculation is performed through calculation between the calculation result of previous layers and a plurality of weights. The plurality of weights of the plurality of neural network layers may be optimized by the learning results of the artificial intelligence model. For example, during a learning process, the plurality of weights may be updated so that a loss value or a cost value obtained from an artificial intelligence model is reduced or minimized. An artificial neural network may include a deep neural network (DNN). For example, the artificial neural network may include a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-neural network, etc., but is not limited thereto.

According to an illustrative embodiment of the present disclosure, the processor may implement artificial intelligence. Artificial intelligence refers to a machine learning method based on artificial neural networks that allows a machine to learn by imitating human biological neurons. Methodology of artificial intelligence may be, depending on a learning method, divided into supervised learning, in which solutions (output data) to problems (input data) are determined by providing input data and output data together as training data, unsupervised learning, in which solutions (output data) to problems (input data) are not determined by providing only input data without output data., and reinforcement learning, in which a reward is given from an external environment whenever an action is taken in a current state and learning is performed to be directed to maximizing the reward. In addition, the methodology of artificial intelligence may be divided according to architecture, which is the structure of a learning model, and the architecture of widely used deep learning technology may be divided into a convolutional neural network, a recurrent neural network, a transformer, and a generative adversarial neural network, etc.

Each of corresponding devices 100 and 200 may include an artificial intelligence model. The artificial intelligence model may be one artificial intelligence model or may be implemented as a plurality of artificial intelligence models. The artificial intelligence model may be configured as a neural network (or an artificial neural network) and may include statistical learning algorithms that mimic biological neurons in machine learning and cognitive science. The neural network may refer to an overall model in which artificial neurons (nodes), which form a network through the combination of synapses, change the strength of the combination of the synapses through learning and have problem-solving capabilities. The neurons in the neural network may include the combination of weights or biases. The neural network may include one or more layers consisting of one or more neurons or nodes. For example, the device may include an input layer, a hidden layer, and an output layer. The neural network that constitutes the device may infer a result to be predicted from arbitrary input by changing the weights of neurons through learning.

A processor may create a neural network, train (or learn) the neural network, or perform calculation on the basis of received input data, and may generate information signals or retrain the neural network on the basis of the result of the performance. Models of the neural network may include various types of models, including CNN, R-CNN, RPN, RNN, S-DNN, S-SDNN, a deconvolution network, DBN, RBM, a fully convolutional network, an LSTM network, and a classification network, etc. such as GoogleNet, AlexNet, and a VGG network but are not limited thereto. The processor may include one or more processors to perform calculation according to the models of the neural network. For example, the neural network may include a deep neural network.

A neural network may include CNN, RNN, perceptron, multilayer perceptron, feed forward (FF) neural network, a radial basis network (RBF), deep feed forward (DFF) neural network, long short term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN). It may be understood by those skilled in the art that the neural network may include any neural network, which is not limited thereto.

According to an illustrative embodiment of the present disclosure, the processor may use various artificial intelligence structures and algorithms, such as a convolution neural network (CNN) such as GoogleNet, AlexNet, and a VGG network, etc., a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzman machine (RBM), a fully convolutional network, a long short-term memory (LSTM) network, a classification network, generative modeling, explainable AI, continual AI, representation learning, AI for material design, BERT, SP-BERT, MRC/QA, text analysis, a dialog system, GPT-3, and GPT-4 for natural language processing, visual analytics, visual understanding, video synthesis, and ResNet for vision processing, and anomaly detection, prediction, time-series forecasting, optimization, recommendation, and data creation for data intelligence, but is not limited thereto. Hereinafter, embodiments of the present disclosure will be described in detail with reference to the attached drawings.

Figure 2:
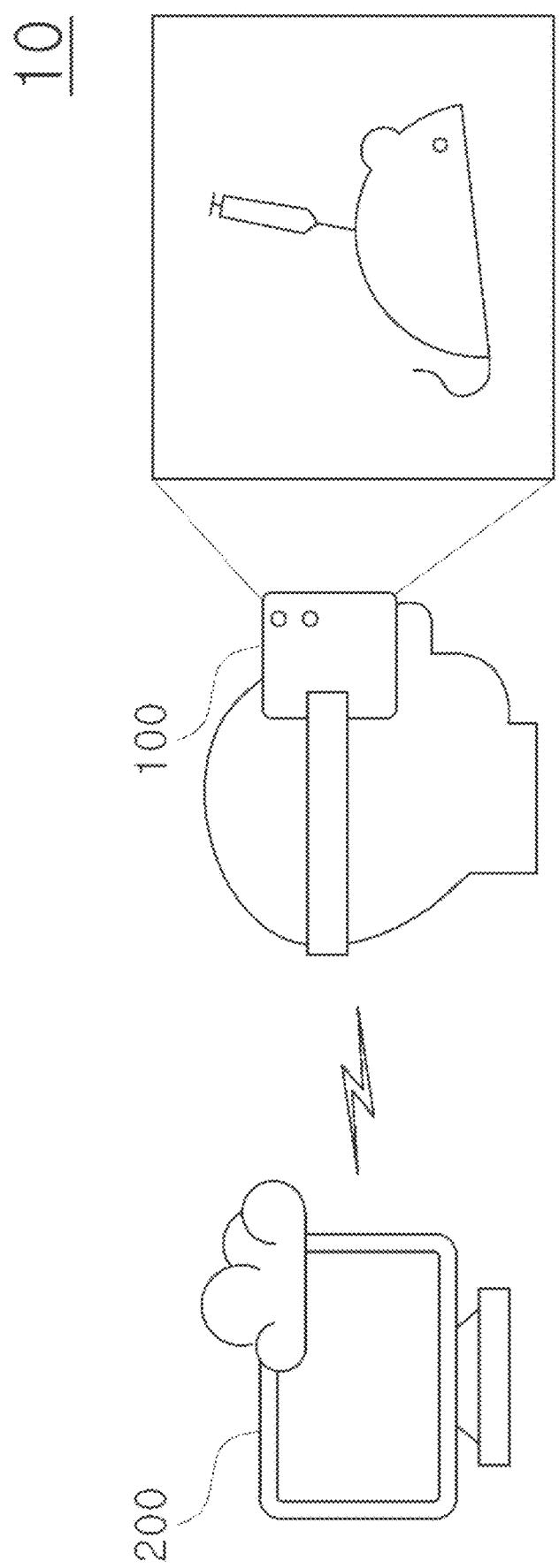

FIGS. 1 and 2 are schematic diagrams of an XR-based animal experiment education system 10 according to an embodiment of the present disclosure.

Referring to FIG. 1, the XR-based animal experiment education system 10 according to the embodiment of the present disclosure includes the XR-based electronic device 100 for XR-based animal experiment education.

However, in some embodiments, the system 10 may include fewer or more components than components shown in FIG. 1.

Referring to FIG. 2, the XR-based animal experiment education system 10 according to an embodiment of the present disclosure includes the server 200 and the XR-based electronic device 100 for XR-based animal experiment education.

However, in some embodiments, the system 10 may include fewer or more components than components shown in FIG. 2.

Difference between FIG. 1 and FIG. 2 is that in FIG. 1, an entity that provides XR-based animal experiment education service is the XR-based electronic device 100 itself, and in FIG. 2, an entity that provides XR-based animal experiment education service is the server 200, wherein The XR-based electronic device 100 owned by a user may receive data about the education service from the server 200 and output the data on the basis of XR for the user to use.

In an embodiment of the present disclosure, a head mounted display (HMD) may be applied as the XR-based electronic device 100.

However, an XR-based animal experiment education device does not necessarily have to be configured in the form of the HMD or the server 200, but may be implemented in the form of a terminal device that provides service and may be applied in such a manner that the XR-based animal experiment education device is connected to the HMD by wire or wirelessly to provide service.

In one embodiment, the electronic device 100 may be configured to include the server 200 and may be implemented in the form of the server 200.

Referring to FIG. 1, the electronic device 100, which provides the XR-based animal experiment education service according to an embodiment of the present disclosure, allows a user who needs education in the practice of an animal experiment to perform practice education on an experimental animal in an XR image rather than an actual experimental animal, so in the practice education in which actual research or experiments are not performed, it is possible to obtain the effects of the practice education even without using experimental animals.

Referring to FIG. 2, the server 200, which provides the XR-based animal experiment education service according to an embodiment of the present disclosure, allows a user who needs education in the practice of an animal experiment to perform practice education on an experimental animal in an XR image rather than an actual experimental animal, so in the practice education in which actual research or experiments are not performed, it is possible to obtain the effects of the practice education even without using experimental animals.

Below, the electronic device 100, the server 200, a method, and a process of a program for XR-based animal experiment education according to an embodiment of the present disclosure will be described in more detail with reference to other drawings.

Figure 3:
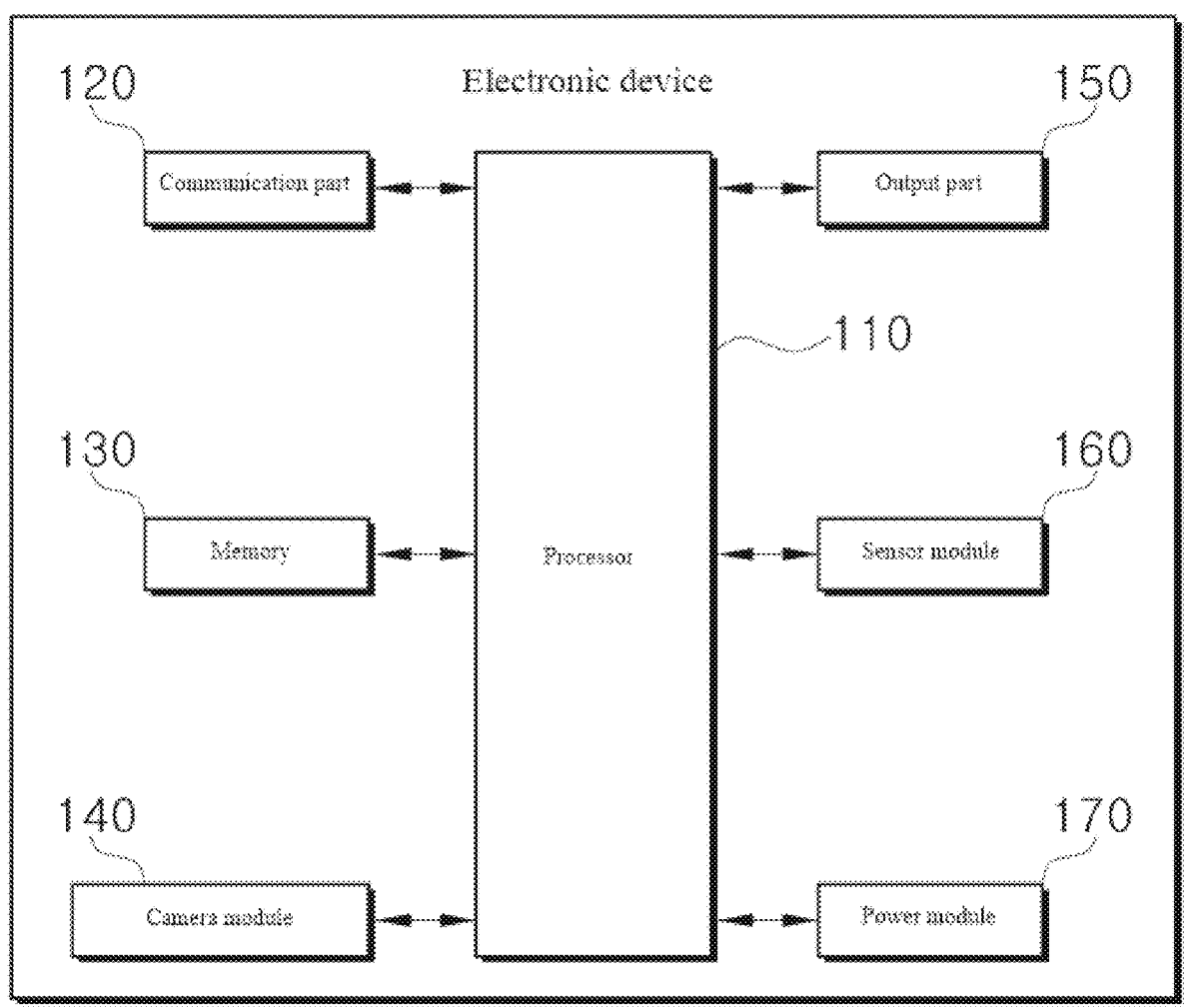

FIGS. 3 and 4 are block diagrams of the XR-based animal experiment education system 10 according to an embodiment of the present disclosure.

FIG. 3 is a block diagram illustrating the configuration of the electronic device 100 included in the XR-based animal experiment education system 10 according to an embodiment of the present disclosure as illustrated in FIG. 1.

FIG. 4 is a block diagram illustrating the configurations of the server 200 and the electronic device 100 included in the XR-based animal experiment education system 10 according to the embodiment of the present disclosure as illustrated in FIG. 2.

The electronic device 100 for XR-based animal experiment education according to an embodiment of the present disclosure includes a processor 110, a communication part 120, a memory 130, a camera module 140, an output part 150, a sensor module 160, and a power module 170.

However, in some embodiments, the electronic device 100 may include fewer or more components than components shown in FIG. 3.

The server 200 for XR-based animal experiment education according to an embodiment of the present disclosure includes a processor 210, a communication part 220, and a memory 230.

However, in some embodiments, the server 200 may include fewer or more components than components shown in FIG. 4.

Referring to FIG. 4, the processor 210 of the server 200 may perform at least some of the operations of the processor 110 on behalf of the processor 110 to provide service for XR-based animal experiment education.

The processor 110 or 210 may control any one or combination of the components described above in order to implement various embodiments according to the present disclosure described in the drawings below on the corresponding device 100 or 200.

In addition to operations related to application programs, the processor 110 or 210 may typically control the overall operation of the corresponding device 100 or 200. The processor 110 or 210 may provide appropriate information or function to a user or process the appropriate information or function by processing signals, data, information, etc. input or output through the components described above or by running application programs stored in a storage part.

Additionally, the processors 110 and 210 may control at least some of the components of the corresponding devices 100 and 200 in order to run application programs stored in the respective memories 130 and 230. Furthermore, the processors 110 and 210 may operate the combination of at least two components of the components included in the corresponding devices 100 and 200 in order to run the application programs.

The processor 110 or 210 may be implemented as one or more processors. Hereinafter, although the processor 110 or 210 is expressed in a singular form, the processor 110 or 210 may be considered as a plurality of processors. The processor 110 or 210 may control the components of the corresponding device 100 or 200. The processor 110 or 210 may refer to a data processing device that has a physically structured circuit to perform functions expressed in codes or instructions included in a program and is built into hardware. Thus, the processor 110 or 210, which is an example of the data processing device built into hardware, may include processing devices, such as a microprocessor, a central processing unit (CPU), a processor core, a multiprocessor, and an application-specific integrated circuit (ASIC), a field programmable gate array (FPGA), etc. but the scope of the present disclosure is not limited thereto. The processor 110 or 210 may be separately provided with a learning processor for performing artificial intelligence calculation, or may be provided with a learning processor thereof.

In various embodiments, the processor 110 or 210 may include one or more of a central processing unit (CPU), an application processor (AP), or a communication processor (CP). At least a portion of the processor 110 or 210, which is hardware, may access the memory 130 or 230 and perform a function related to instructions stored in the memory 130 or 230.

The communication part 120 or 220 may include one or more modules that connect the electronic device 100 to one or more networks.

The communication part 120 or 220 may include one or more components that enable communication with an external device, for example, at least one of a broadcast reception module, a wired communication module, a wireless communication module, a short range communication module, and a location information module.

A wired communication module may include various wired communication modules such as a local area network (LAN) module, a wide area network (WAN) module, or a value added network (VAN) module, etc., and various cable communication modules such as a universal serial bus (USB) module, a high definition multimedia interface (HDMI), a digital visual interface (DVI), recommended standard 232 (RS-232), power line communication, or plain old telephone service (POTS), etc.

A wireless communication module may include wireless communication modules that support various wireless communication methods such as a global system for mobile communication (GSM), code division multiple access (CDMA), wideband code division multiple access (WCDMA), and universal mobile telecommunications system (UMTS), time division multiple access (TDMA), long term evolution (LTE), 4G, 5G, 6G, etc. in addition to a Wi-Fi module and a wireless broadband (WiBro) module.

A wireless communication module may include a wireless communication interface including an antenna that transmits communication signals and a transmitter. In addition, the wireless communication module may further include a signal conversion module that modulates a digital control signal output from the processor 110 or 210 into an analog wireless signal through a wireless communication interface according to the control of the processor 110 or 210.

A short range communication module, which is for short range communication, may support short range communication by using at least one of technologies such as Bluetooth, radio frequency identification (RFID), infrared data association (IrDA), ultra-wideband (UWB), Zigbee, near field communication (NFC), wireless-fidelity (Wi-Fi), Wi-Fi Direct, and wireless universal serial bus (USB).

The communication part 120 or 220 may use the name of a communication interface.

A communication interface may establish communication between the electronic device 100 and an external device. For example, the communication interface may communicate with the external device through wireless communication (e.g., wireless fidelity (Wi-Fi), Bluetooth, near field communication (NFC), magnetic stripe transmission (MST), etc.) or wired communication.

The memory 130 or 230 may store data supporting various functions of the corresponding device 100 or 200. The memory 130 or 230 may store multiple application programs (application programs or applications) running on the corresponding device 100 or 200, data and instructions for operating the corresponding device 100 or 200. At least some of such application programs may exist for the basic functions of the corresponding device 100 or 200. Meanwhile, the application programs may be stored in the memory 130 or 230, be installed in the device, and be driven by the processor 110 or 210 to perform an operation (or a function).

The memory 130 or 230 may store data supporting various functions of the corresponding device 100 or 200 and programs for operating the processor 110 or 210, may store input/output data (e.g., music files, still images, videos, etc.), and may store multiple application programs (application programs or applications) running on the corresponding device 100 or 200, data and instructions for operating the corresponding device 100 or 200. At least some of these applications may be downloaded from the server 200 outside through wireless communication.

The memory 130 or 230 may include at least one type storage medium among flash type memory, hard disk type memory, solid state disk (SSD) type memory, silicon disk drive (SDD) type memory, multimedia card micro type memory, card type memory (e.g., SD or XD memory, etc.), random access memory (RAM), static random access memory (SRAM), read-only memory (ROM), electrically erasable programmable read-only memory (EEPROM), programmable read-only memory (PROM), magnetic memory, a magnetic disk, and an optical disk. Additionally, the memory 130 or 230, which is separated from the corresponding device 100 or 200, but connected thereto by wire or wirelessly, may be database.

The memory 130 or 230 may be electrically connected to the processor 110 or 210 and may store at least one code executed by the processor 110 or 210. The memory 130 or 230 may collectively refer to various types of storage devices. The memory 130 or 230 may store information required to perform calculation by using artificial intelligence, machine learning, and artificial neural networks.

The memory 130 or 230 may store various learning models. The learning models stored in the memory 130 or 230 may infer result values for new input data other than learning data, and inferred values may be used as a basis for determination to perform certain operations. The learning models stored in the memory 130 or 230 may perform learning on the basis of label information, and may apply various backpropagation algorithms so that a loss function has a target value to increase the accuracy of the learning.

The memory 130 or 230 stores at least one XR-based image for virtual practice of an animal experiment.

The memory 130 or 230 stores reference practice information including the order of each of practice movements included in each education course for virtual practice and a normal movement range for each of the practice movements.

Additionally, the memory 130 or 230 may include a plurality of processes for the electronic device 100.

The camera module 140 processes image frames, such as still images or videos, obtained by an image sensor in a shooting mode. Processed image frames may be displayed on the display or stored in the memory 130 or 230.

The camera module 140 may shoot still images and videos. For example, when the electronic device 100 is mounted on the HMD, the camera module 140 may capture images of at least the front area of the HMD. In one embodiment, the camera module 140 may be activated when a specified time has elapsed from the start of the operation of the HMD after the electronic device 100 is mounted on the HMD. In various embodiments, the camera module 140 may be activated from a time point at which the electronic device 100 is mounted on the HMD. Alternatively, the camera module 140 may be activated from a time point at which a user wears the HMD.

In various embodiments, the camera module 140 may include, for example, at least one depth camera (e.g., a time-of-flight (TOF) method or a structured light method) and a color camera (e.g., an RGB camera). Additionally, the camera module 140 may further include at least one sensor (e.g., a proximity sensor) and a light source (e.g., an LED array), etc. in relation to performing functions. In various embodiments, the at least one sensor may be configured as a separate module from the camera module 140 and may sense at least the front area of the HMD. For example, a sensor (e.g., a proximity sensor) module may sense an object by irradiating the front area of the HMD with infrared rays (or ultrasonic waves) and receiving infrared rays (or ultrasonic waves) reflected from the object. In this case, the camera module 140 may be activated from a time point at which at least one object is sensed by the sensor module 160.

The processor 110 or 210 may perform calculation or data processing related to control and communication of one or more other components of the electronic device 100. For example, the processor 110 or 210 may receive practice image data captured from the camera module 140 and detect an object present within the shooting range of the camera module 140 based on the practice image data.

In one embodiment, the processor 110 or 210 may calculate or detect the number of one or more detected objects, the sizes of the objects, a distance between the objects and the HMD (or a user wearing the HMD), and the movements of the objects, etc. The processor 110 or 210 may control the operation of a display on the basis of the calculated or detected information.

The output part 150 is intended to generate an output related to visual, auditory, or tactile sensation, and may include at least one of a display module, a sound output part, a haptic module, and an optical output part. A display part may implement a touch screen by forming a mutual layer structure with a touch sensor or by being integrated with the touch sensor. This touch screen may function as a user input part that provides an input interface between the corresponding device 100 or 200 and a user, and may simultaneously provide an output interface between the corresponding device 100 or 200 and a user.

The display module displays (outputs) information processed in the corresponding device 100 or 200. For example, the display part may display execution screen information of an application program (for example, an application) running on the corresponding device 100 or 200, or user interface (UI) information and graphic user interface (GUI) information according to this execution screen information.

The display may display various types of contents (e.g., text, images, videos, icons, symbols, etc.). For example, the display may display an image corresponding to at least one image data included in the application program. In various embodiments, when the electronic device 100 adopts a VR mode, the display may display one image to be divided into two images by corresponding to the left eye and the right eye of a user. In various embodiments, a display may include a liquid crystal display (LCD), a light-emitting diode (LED) display, an organic LED (OLED) display, a microelectromechanical system (MEMS) display, an augmented reality (AR) glass, or an electronic paper display.

The display may display extended reality (XR) images.

In one embodiment, the output part 150 of the electronic device 100 may include a display module, wherein the display module may consist of at least one display.

For example, the electronic device 100 may include a first display provided to correspond to both eyes of a user of the HMD, and may include a second display such as a monitor outside the HMD.

The sound output part may output audio data received through the communication part 120 or 220 or stored in the storage part, or output sound signals related to a function performed in the corresponding device 100 or 200. The sound output part may include a receiver, a speaker, a buzzer, etc.

The sensor module 160 senses at least one of internal information of the corresponding device 100 or 200, surrounding environment information surrounding the corresponding device 100 or 200, and user information, and generates a sensing signal corresponding thereto. On the basis of the sensing signal, the processor 110 or 210 may control the driving or operation of the corresponding device 100 or 200, or perform data processing, functions, or operations related to an application program installed in the corresponding device 100 or 200.

The sensor module 160 as described above may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., a camera), a microphone, an environmental sensor (e.g., at least one of a barometer, a hygrometer, a thermometer, a radiation detection sensor, a heat detection sensor, and a gas detection sensor), and a chemical sensor (e.g., a healthcare sensor and a biometric sensor, etc.). Meanwhile, the corresponding device 100 or 200 may combine and utilize information sensed by at least two of these sensors.

The power module 170 may supply power to the electronic device 100 and include a battery device to be implemented wirelessly, In addition, the electronic device 100 may further include components such as an input part and an interface part.

The input part is intended to input image information (or a signal), audio information (or a signal), data, or information input from a user, and may include at least one of at least one camera, at least one microphone, and a user input part. Voice data or image data collected from the input part may be analyzed and processed by the control command of a user.

The input part is intended to receive information from a user, and when information is input through the input part, the processor 110 or 210 may control the operation of the corresponding device 100 or 200 to correspond to the input information. The input part may include a hardware-type physical key (e.g., a button, a dome switch, a jog wheel, or a jog switch, etc. located on at least one of the front, rear, and side of the corresponding device 100 or 200) and a software-type touch key. For example, the touch key may be configured as a virtual key, a soft key, or a visual key displayed on the display part of a touch screen through software processing, or may be configured as a touch key disposed on a portion other than the touch screen. Meanwhile, the virtual key or visual key may be displayed on the touch screen in various forms and, for example, may be configured as graphics, text, icons, videos, or combination thereof.

The interface part serves as a passageway to various types of external devices connected to the corresponding device 100 or 200. The interface part may include at least one of a wired/wireless headset port, an external charger port, a wired/wireless data port, a memory card port, a port connecting devices provided with identification modules (SIM), an audio input/output (I/O) port, a video input/output (I/O) port, and an earphone port. The corresponding device 100 or 200 may perform appropriate control related to the external devices connected to the interface part.

An input/output interface may serve as an interface that is able to transmit commands or data input from a user or other external devices to other components of the electronic device 100. Additionally, the input/output interface may output commands or data received from other components of the electronic device 100 to a user or other external devices.

Figure 5:
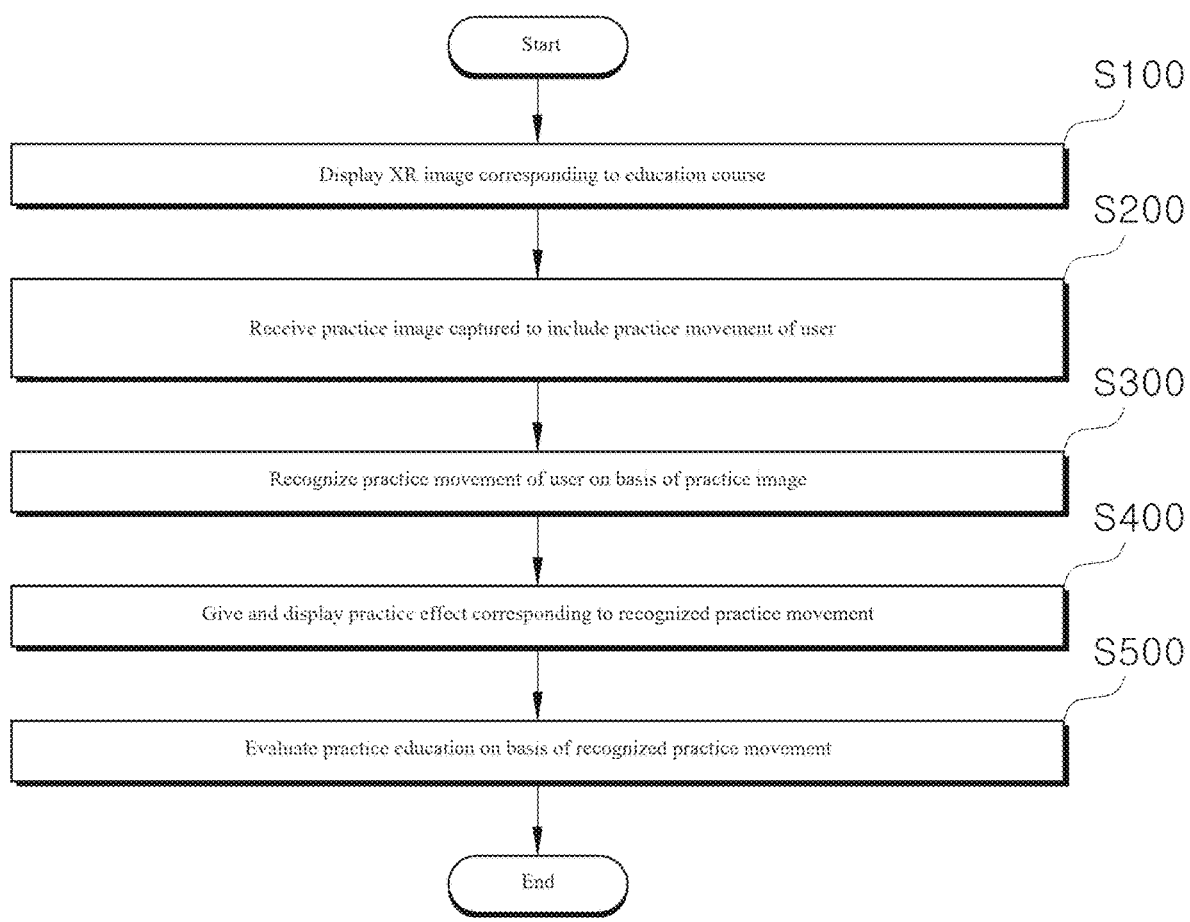
FIG. 5 is a flowchart of an XR-based animal experiment education method according to an embodiment of the present disclosure.

FIG. 5 is a flowchart of an XR-based animal experiment education method according to an embodiment of the present disclosure.

FIGS. 6 to 10 are various example views illustrating the operations of the electronic device 100, the server 200, a method, and a program for XR-based animal experiment education according to an embodiment of the present disclosure.

The processor 110 or 210 displays XR images corresponding to a practice education course on an experimental animal of a user on the display module at S100.

The processor 110 or 210 receives a practice image captured to include the practice movement of a user for the XR images at S200.

Before S100, a process in which the processor 110 or 210 receives the practice education course of a user or recognizes the practice education course of a user based on information of the user may be added.

More specifically, when an education course for the experimental animal practice of a user is input, the processor 110 or 210 may display an XR image of an experimental subject corresponding to the education course on the display module.

In one embodiment, an experimental subject may be an XR image content, or an actual model. Selection of this configuration may be easily made according to an embodiment of the present disclosure.

For example, when an experimental subject is an actual model, the processor 110 or 210 may determine an educational course for experimental animal practice of a user by recognizing the type of the model of the experimental subject in an image captured through the camera module 140.

In one embodiment, the processor 110 or 210 may determine that practice education has started when at least one marker located on a table (an experiment table) is recognized in the captured image of the camera module 140, and may display an XR image corresponding to the education course of a user on the display to correspond to the position of the marker.

When it is determined that the education course of the experimental animal practice of a user has begun or an education start signal is received, the processor 110 or 210 may control the education course to start and the camera module 140 to operate.

In one embodiment, the processor 110 or 210 may perform the process of guiding a user to a corresponding education course by displaying at least one practice movement that the user is required to practice in the corresponding education course and a corresponding part of an experimental subject related to the practice movement on the display.

Figure 6:
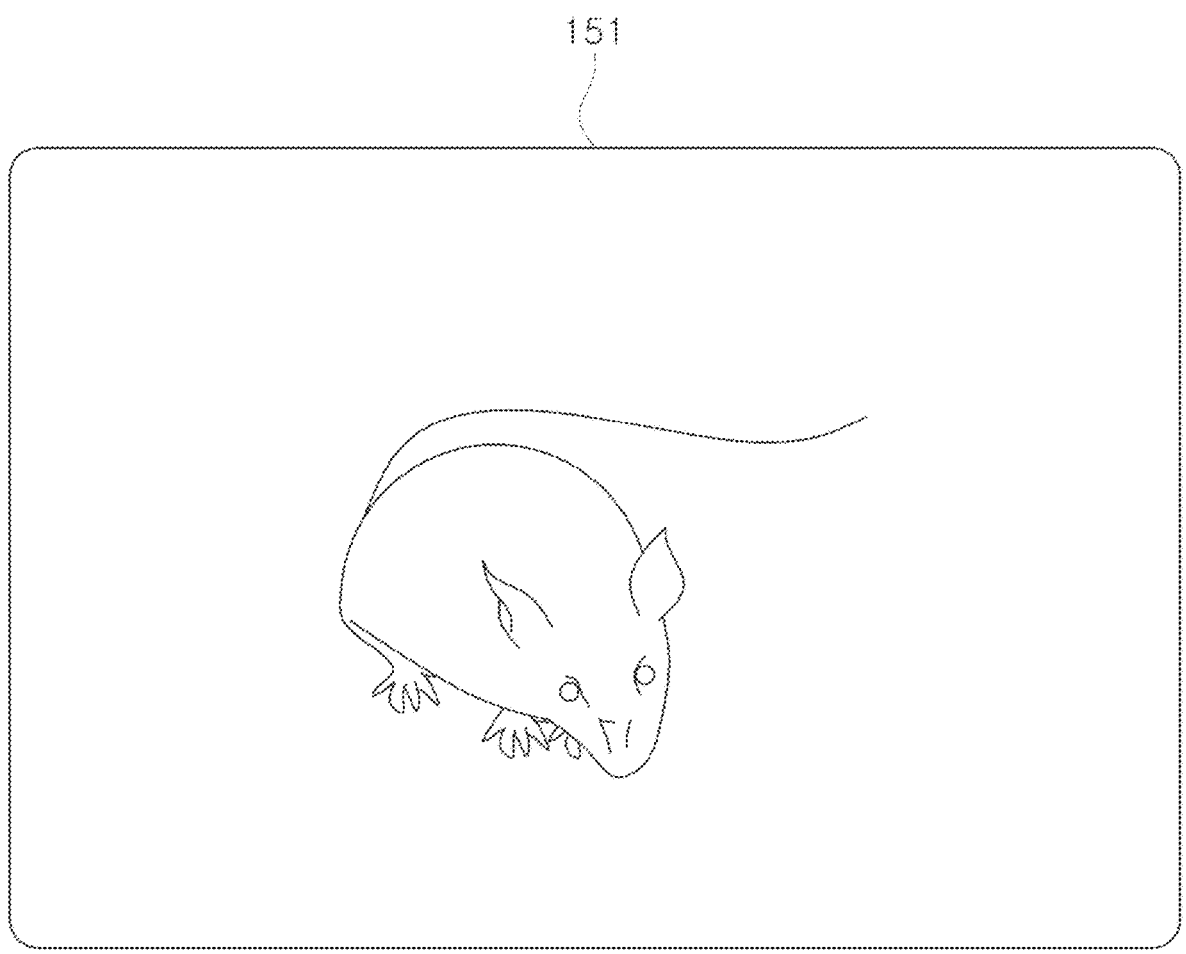
FIG. 6 is a view illustrating an XR image of an experimental subject displayed on the display module of an electronic device.

FIG. 6 is a view illustrating an XR image of an experimental subject displayed on the display module of the electronic device 100.

Referring to FIG. 6, the processor 110 or 210 is illustrated to display an XR image of a white rat on the display according to the education course of experimental animal practice of a user.

A user wearing the HMD feels as if an experimental subject were present on an experiment table according to an XR image seen with both eyes.

The user performs practice education by virtually manipulating the experimental subject displayed as the XR image on the display as shown in FIG. 6.

In this case, the user may virtually manipulate the experimental subject displayed as the XR image and fix the experimental subject on the experiment table.

According to an embodiment, the XR image of the experimental subject may be displayed to be fixed on the experimental table from the beginning to perform a dissection experiment, or may be displayed as shown in FIG. 6 so that it is able to be asked for a user to perform a fixing process by himself or herself.

The processor 110 or 210 recognizes the practice movement of a user based on the practice image of S200 at S300

The processor 110 or 210 displays an XR image by giving a practice effect corresponding to the practice movement recognized at S300 at S400.

The processor 110 or 210 displays a specific XR image corresponding to the education course of a user on a display, and recognizes the practice movement of the user on the basis of a practice image including the practice movement of the user performed on an experimental subject in the corresponding XR image when the practice image is received from the camera module 140.

The processor 110 or 210 may receive images captured through the camera module 140 and analyze the images in real time to recognize an object present in the images.

In this case, the object may be an experiment table, a model of an experimental subject, the hand of a user, or an experimental tool.

When at least one object is recognized in a practice image, the processor 110 or 210 may recognize the practice movement of a user by tracking the corresponding object.

In addition, the processor 110 or 210 may display an XR image by giving at least one practice effect corresponding to a practice movement recognized in the corresponding XR image.

Figure 7:
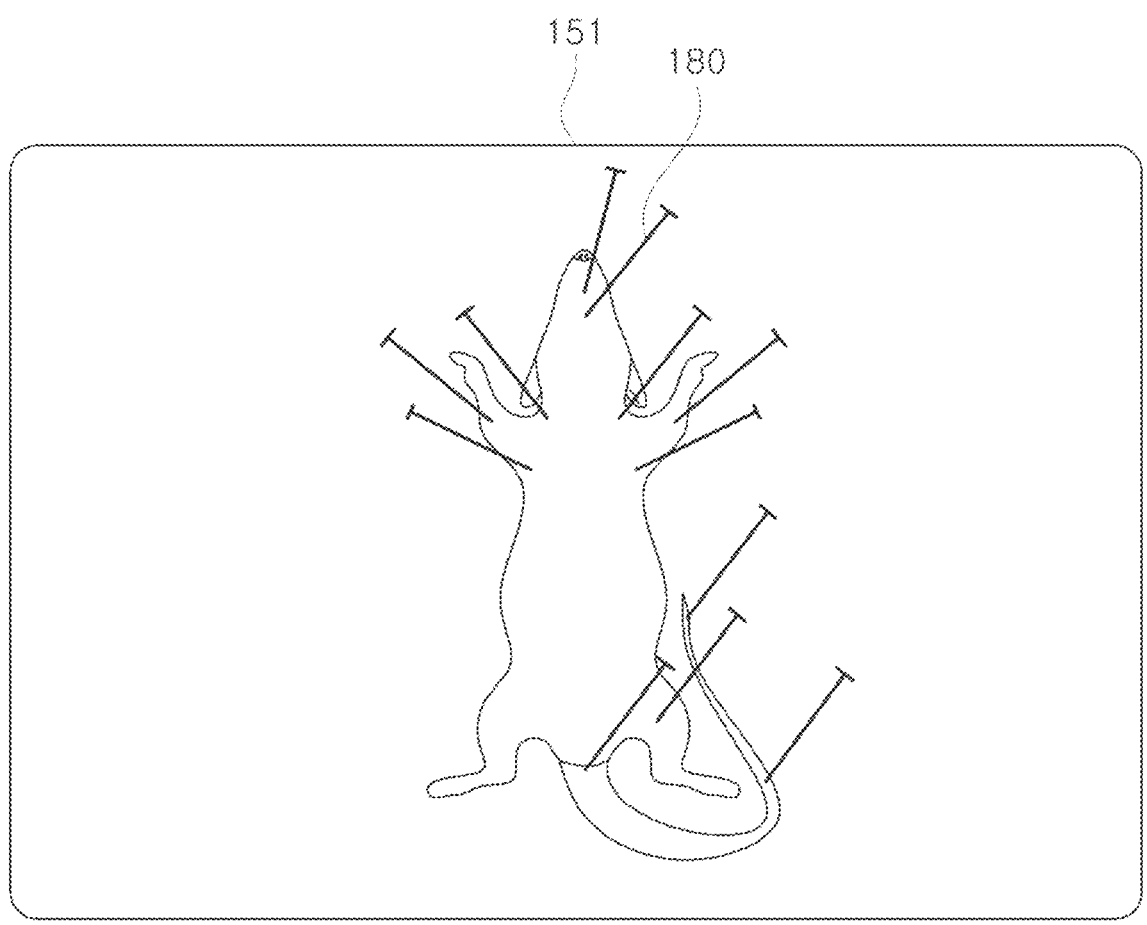
FIG. 7 is a view illustrating the experimental subject of FIG. 6 fixed to a fixing device by the practice movements of a user.

FIG. 7 is a view illustrating the experimental subject of FIG. 6 fixed to a fixing device by the practice movement of a user.

Figure 8:
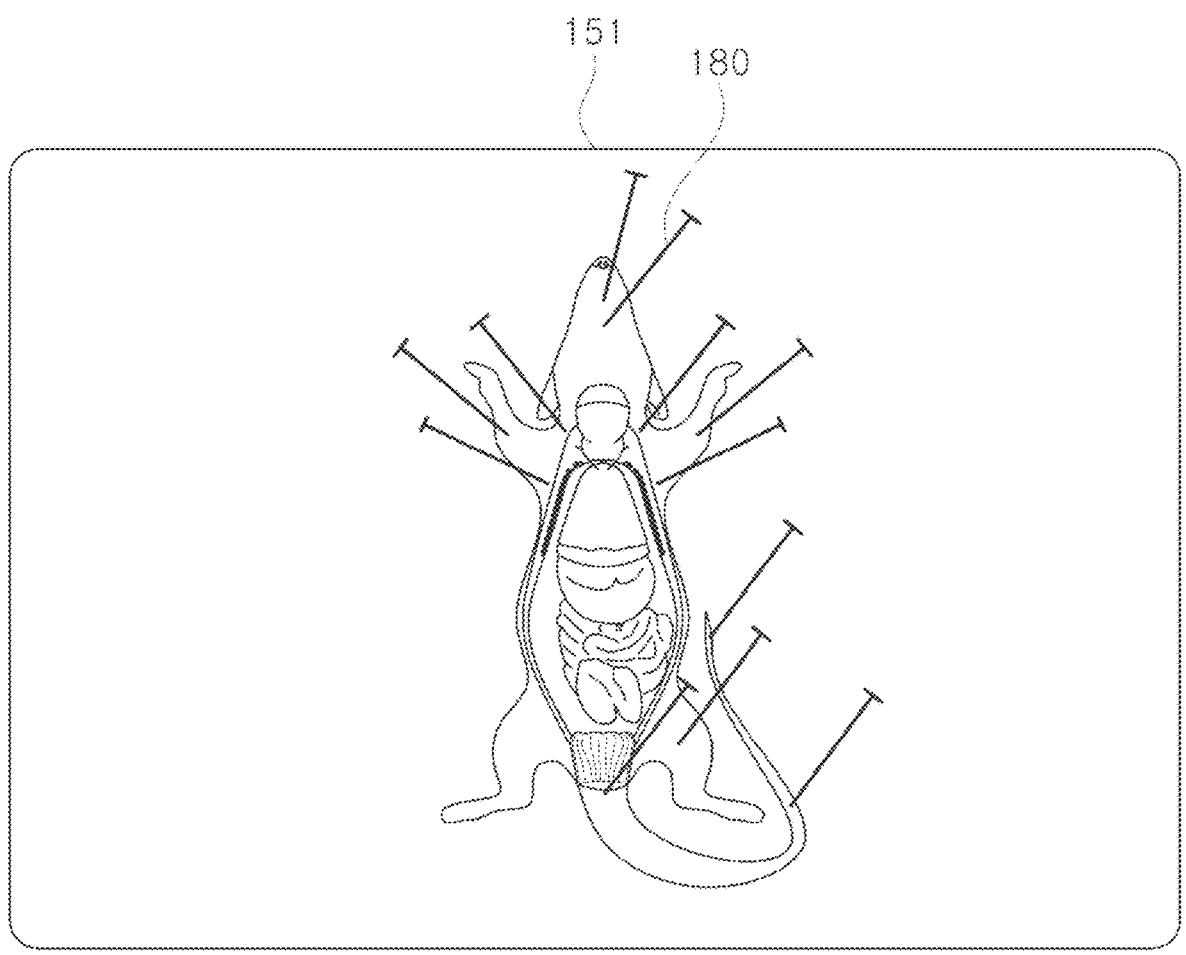
FIG. 8 is a view illustrating an XR image displaying that the experimental subject fixed as shown in FIG. 7 is laparotomized by the laparotomy-related practice movements of a user.

FIG. 8 is a view illustrating an XR image displaying that the experimental subject fixed as shown in FIG. 7 is laparotomized by the laparotomy-related practice movements of a user.

Referring to FIG. 7, when a user performs the practice movement of fixing an experimental subject displayed as an XR image on a display to an experiment table, the processor 110 or 210 may recognize this through the captured image of the camera module 140 and control the experimental subject of the XR image to be moved and fixed to the experiment table according to the practice movement of the user.

Any experimental tool may be applied as long as the experimental tool is a tool for practicing animal experiments, and FIG. 7 illustrates a fixing experimental tool 180 for fixing an experimental subject among experimental tools.

The processor 110 or 210 may determine whether a user has properly fixed an experimental subject on the basis of the positions of the experimental subject in an XR image and a fixing tool in a captured practice image.

However, the experimental tool 180 for fixing an experimental subject as shown in FIG. 7 need not necessarily be a real object, and the processor 110 or 210 may virtually display even the experimental tool 180 for fixing an experimental subject as an XR image.

In one embodiment, the processor 110 or 210 may predict the movement of an experimental subject changed by the location and intensity of contact of the experimental tool with the experimental subject, based on a practice image captured through the camera module 140.

Additionally, the processor 110 or 210 may render an XR image to reflect the predicted movement of the experimental subject.

In one embodiment, a specific XR image displayed on the display may correspond to a specific body part of an experimental subject.

In addition, the processor 110 or 210 may display, on the display module, first visual information indicating a type of an experimental tool required for a user to perform a practice movement and a position of the body part corresponding to the practice movement within the specific XR image.

More specifically, the processor 110 or 210 may control an experimental tool to be displayed in an XR image when the experimental tool is required according to the practice education course of a user.

The processor 110 or 210 may display, on the display module, the first visual information including at least one of an education goal corresponding to a practice education course of a user, description about the education course, and information indicating the location of a body part (an organ, etc.) of an experimental subject corresponding to the education course.

In other words, the first visual information may be introduction or explanation of an education course to be performed this time.

In one embodiment, the processor 110 or 210 may display visual information pointing out the incorrect practice movements of a user on the display module.

For example, the memory stores precautions related to detailed movements included in each practice movement. In addition, when the practice movement recognized at S300 is not in the normal movement range, the processor 110 or 210 may check detailed movements related to the practice movement recognized at S300 and may display precautions corresponding thereto on the display module.

In one embodiment, when it is determined that the practice movement of a user is incorrect as described above, the processor 110 or 210 may load a normal movement range related to the practice movement from the memory and may display an XR image including a normal practice movement on the display module.

Figure 9:
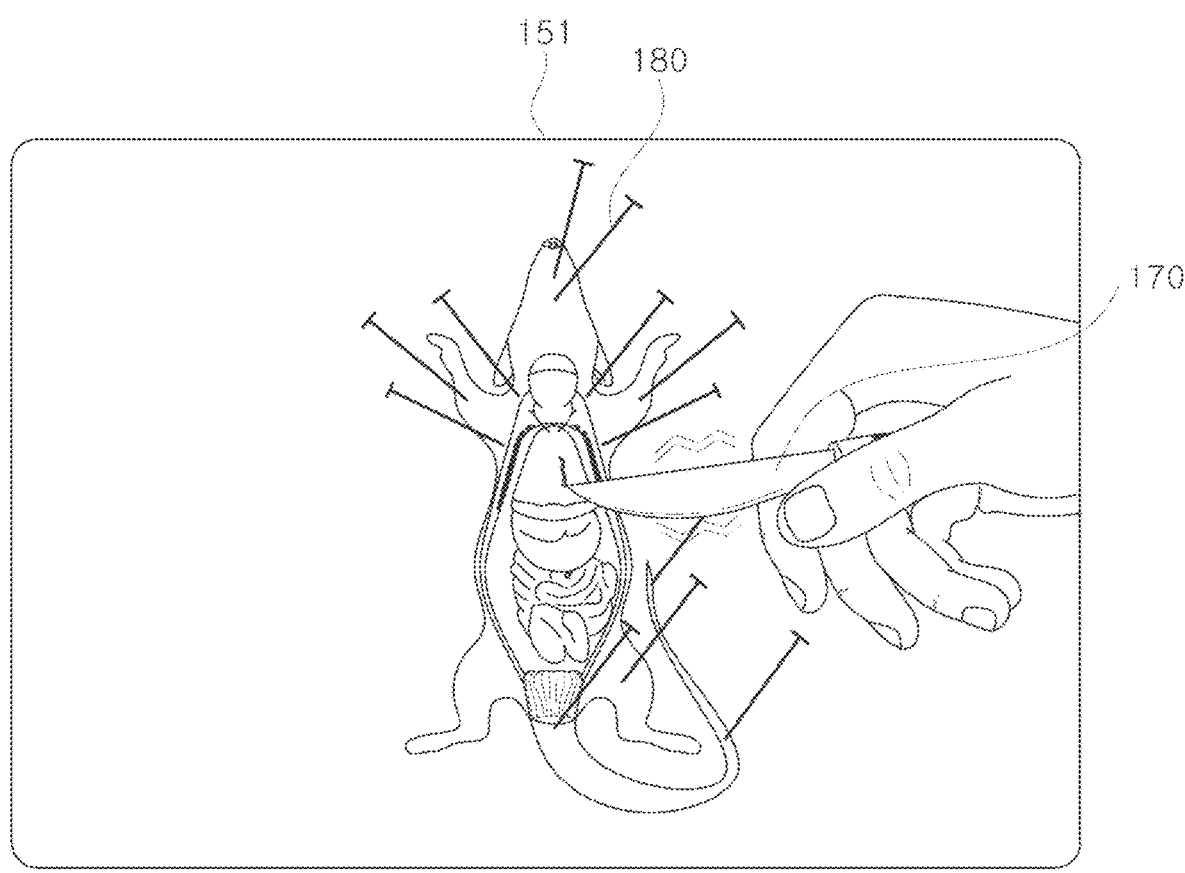
FIG. 9 is a view illustrating that a practice effect is given to an XR image by the practice movement of a user and a vibration effect is provided to an experimental tool of the user.

FIG. 9 is a view illustrating that a practice effect is given to an XR image by the practice movement of a user and a vibration effect is provided to an experimental tool of the user.

In an embodiment of the present disclosure, at least one type of experimental tool may be applied to the experimental tool, and as described above, the experimental tool may be a physical experimental tool or a virtual experimental tool in an XR image.

An embodiment described below may be an example of a physical experimental tool.

The experimental tool may include the haptic module (not shown) that generates vibration sounds and the communication part (not shown).

The processor 110 or 210 may communicate with the experimental tool through the communication part and may remotely control the experimental tool by transmitting a control signal thereto according to the practice movement of a user.

Referring to FIG. 9, a user is illustrated to practice by using an experimental tool targeting a specific organ of an experimental subject in an XR image.

When a practice movement as illustrated in FIG. 9 is performed, when an organ is a moving organ; the processor 110 or 210 may perform the following operations to provide realistic effects.

The processor 110 or 210 may control the haptic module of the experimental tool to generate vibration sounds indicating the location and intensity of contact of the experimental tool with the specific part of an experimental subject based on a practice image received from the camera module 140.

Specifically, the processor 110 or 210 may predict the movement of an experimental subject changed by the location and intensity of the contact of the experimental tool with the experimental subject based on an image captured through the camera module 140, and may control the haptic module to provide a practice effect corresponding to the predicted movement.

Through this, when a user uses the experimental tool to touch the experimental subject in an XR image and perform a practice movement, the electronic device 100 may provide a practice effect as if the body part of the experimental subject moved according to the performed practice movement.

For example, in the initial stage of an experiment performed on an experimental animal, when the experimental animal is alive and an experimental tool touches a moving body part thereof, the processor 110 or 210 may control the haptic module of the experimental tool to provide a practice effect corresponding to the intensity of contact of the experimental tool with the corresponding body part.

Unlike this, when an experimental animal is dead after the initial stage of an experiment performed on an experimental animal and no movement is expected in a body part thereof, the processor 110 or 210 does not provide the above vibration effect.

Alternatively, when a body part of an experimental animal contacted by an experimental tool corresponds to a motionless part even if the experimental animal is alive, the processor 110 or 210 does not provide the above vibration effect.

Figure 10:
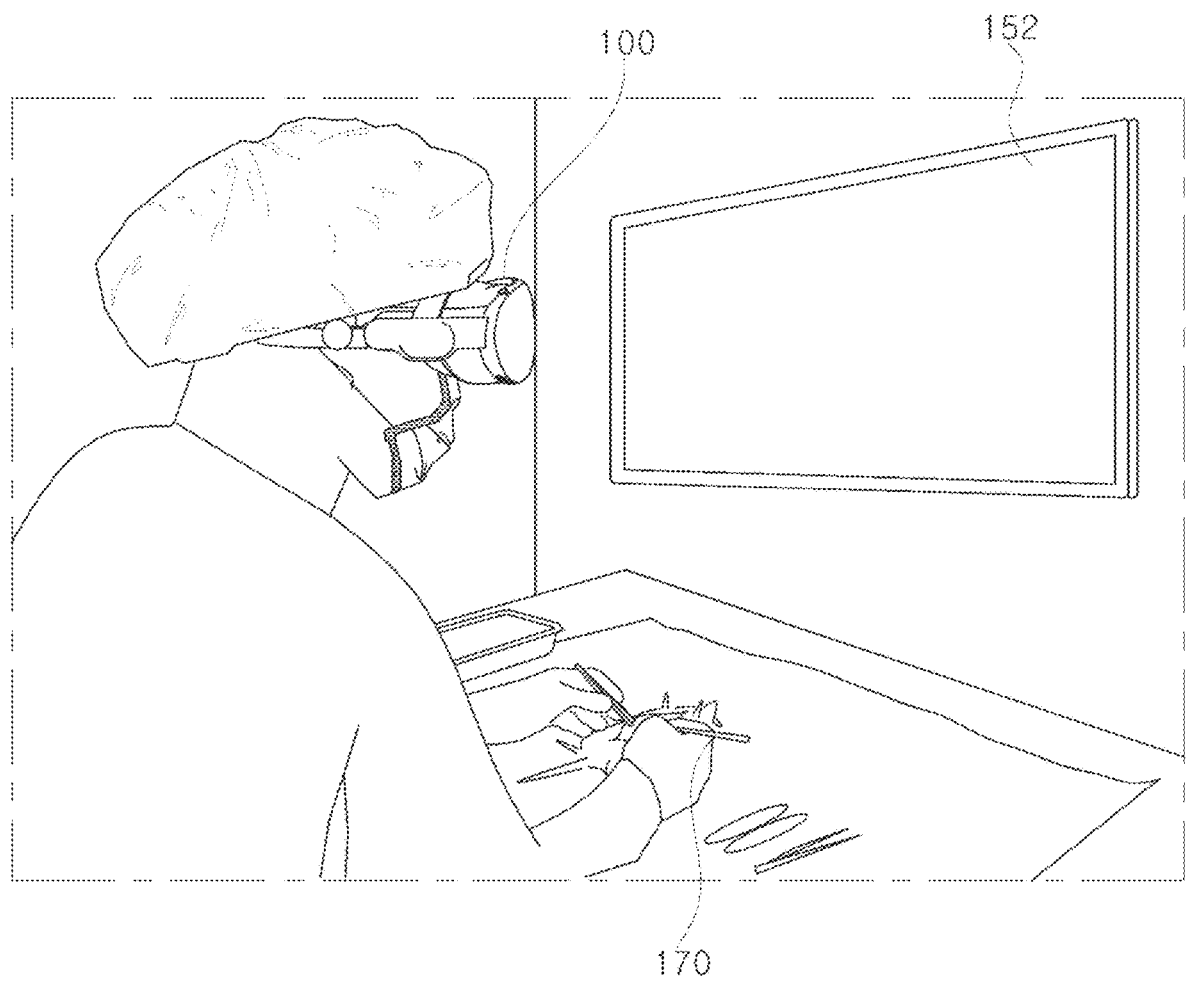
FIG. 10 is a view illustrating that visual information showing the effect of seeing through the internal situation of an organ by the practice movement of FIG. 9 is displayed on a second display.

FIG. 10 is a view illustrating that visual information showing the effect of seeing through the internal situation of an organ by the practice movement of FIG. 9 is displayed on a second display.

The processor 110 or 210 may display, on the display module, second visual information indicating the effect of seeing through the internal situation of an organ of an experimental subject on which a practice movement is performed with an experimental tool in an XR image on the display module.

More specifically, referring to FIG. 10, the display module may include the first display included in the HMD worn by a user and the second display outside, and the processor 110 or 210 may display the second visual information by using the second display.

Accordingly, a user may perform virtual practice education through an XR image displayed on the first display, and check the internal situation of the body part of an experimental subject by the practice movement of the user through an image displayed on the second display, and thus the user is able to more accurately determine whether the practice movement of the user is correct.

The processor 110 or 210 evaluates the practice education of a user on the basis of the practice movement recognized at S300 at S500.

The processor 110 or 210 may calculate at least one of a score for the order of the practice movement of a user and a score for whether the practice movement of the user is normal on the basis of the reference practice information stored in the memory and the practice movement of the user recognized during an education course.

Additionally, the processor 110 or 210 may evaluate the practice education of the user on the basis of the calculated score.

For example, the processor 110 or 210 may determine completion or reeducation of the corresponding practice education course of the user on the basis of the calculated score.

In one embodiment, when the reeducation of the user for the corresponding practice education course is determined on the basis of the calculated score, the processor 110 or 210 may check detailed items of the calculated score to check items and practice movements that require the reeducation.

According to the XR-based animal experiment education system according to an embodiment of the present disclosure, it is possible to provide help when finding alternatives to avoid an animal experiment.

According to the XR-based animal experiment education system according to an embodiment of the present disclosure, animal experiments are conducted in a virtual environment, thereby minimizing the use of animals or reducing the number of animals sacrificed.

Additionally, an experiment director and researchers (users) are able to safely conduct experiments and train new technologies or procedures in a virtual environment.

In addition, education related to facility entry is also possible, and unlike the conventional experiment of actual animals, it is possible to implement an animal experiment in various places or meeting places.

In addition, according to the XR-based animal experiment education system according to an embodiment of the present disclosure, real-time simulation and manipulation are possible, so experimental results are able to be checked and manipulated in real time in a virtual environment, thereby enabling the planning and adjusting of experiments in advance.

In addition, while the experiment of actual animals is costly, the XR-based animal experiment education system according to an embodiment of the present disclosure has the effect of reducing material costs and animal management costs by conducting experiments in a virtual environment.

In addition, the experiment of actual animals has limitations in environment and conditions, but according to the XR-based animal experiment education system according to an embodiment of the present disclosure, in a virtual environment, experiments are able to be performed in environments or conditions that are difficult in reality, thereby enabling the generation of data that are not able to be obtained in actual experiments or the observation of reactions under various conditions.

In addition, according to the XR-based animal experiment education system according to an embodiment of the present disclosure, in a virtual experiment environment, experimental results and data are able to be effectively recorded and stored, be easily shared with other researchers, and be extended to various areas.

Additionally, according to the XR-based animal experiment education system according to an embodiment of the present disclosure, by conducting animal experiments virtually, it is possible to introduce and inspect facilities without visiting the basic research-related field of an experimental animal committee, and it is possible to build programs for practice and education to obtain a license, which is able to be checked even through a mobile device.

Furthermore, according to the XR-based animal experiment education system according to an embodiment of the present disclosure, it is possible to select educational images, app linkage security and online certificate issuance, a configuration that allows a presenter or a lecturer to directly explain each point while playing or pausing a screen, or options that are able to be directly manipulated by an education recipient.

In the XR-based animal experiment education system according to an embodiment of the present disclosure, an education course for virtual practice of an animal experiment may include at least one education course.

For example, an education course may be configured to include at least one of a correction method, an anesthesia method, an administration method, and a blood collection method.

In addition, each education course may include at least one detailed education course.

Alternatively, each education course may include at least one practice movement.

As described above, according to the present disclosure, the effect of educating an XR-based animal experiment is provided.

In addition, according to the present disclosure, it is possible to provide a realistic practice education effect by giving and displaying a practice effect corresponding to the practice movement of a user in an XR image.

The method according to an embodiment of the present disclosure described above may be implemented as a program (or an application) and stored in a medium in order to be executed in combination with the server, which is hardware.

The above-mentioned program may include codes coded in computer languages such as C, C++, JAVA, machine languages, etc. that the processor (CPU) of the computer is capable of reading through the device interface of the computer in order for the computer to read a program and execute the methods implemented as the program. These codes may include functional codes related to a function that defines functions required for executing the above methods, and may include control codes related to execution procedures necessary for the processor of the computer to execute the above functions according to predetermined procedures. In addition, these codes may further include memory reference-related codes that indicate at which location (an address) in internal or external memory of the computer additional information or media required for the processor of the computer to execute the above functions should be referenced. In addition, these codes may include communication-related codes for how to communicate with any other remote computer or server by using the communication module of the computer, and what information or media should be transmitted and received during communication when the processor of the computer is required to communicate with any other remote computer or server to execute the above functions.

The storage medium refers to a medium that stores data semi-permanently and is readable by a device, rather than a medium that stores data for a short period of time, such as a register, cache, or memory. Specifically, examples of the storage medium include ROM, RAM, CD-ROM, a magnetic tape, a floppy disk, an optical data storage device, etc., but are not limited thereto. That is, the program may be stored in various recording media in various servers that the computer is able to access or in various recording media in the computer of a user. Additionally, the media may be distributed to computer systems connected with a network, and computer-readable codes may be stored in a distributed manner.

The method or the stages of algorithms described in connection with the embodiments of the present disclosure may be implemented directly by hardware, implemented by a software module executed by hardware, or by combination thereof. The software module may reside in random access memory (RAM), read only memory (ROM), erasable programmable ROM (EPROM), electrically erasable programmable ROM (EEPROM), flash memory, a hard disk, a removable disk, CD-ROM, or any type of computer-readable recording medium well known in the art to which the present disclosure pertains.

While the present disclosure has been described with reference to embodiments, it will be apparent to those skilled in the art that various changes and modifications may be made without departing from the spirit and scope of the present disclosure. Therefore, it should be understood that the above embodiments are not limiting, but illustrative.

What is claimed is:

1. An electronic device comprising:
   a camera module;
   a display module configured to include at least one display that displays extended reality (XR) images;
   a memory configured to store one or more XR images for virtual practice of an animal experiment, and reference practice information including order of each of practice movements included in each education course for the virtual practice and a normal movement range for each of the practice movements;

a processor configured to display a specific XR image corresponding to an education course of a user among the one or more XR images on the display module and to recognize a practice movement of the user on a basis of a practice image including the practice movement of the user performed on an experimental subject in the specific XR image when the practice image is received from the camera module, wherein the processor is further configured to:
give and display at least one practice effect corresponding to the recognized practice movement of the user in the specific XR image; and
evaluate a practice education of the user on a basis of the recognized practice movement during the corresponding education course, wherein the specific XR image corresponds to a specific body part of the experimental subject, wherein the processor is further configured to control the display module to:
display first visual information indicating a type of an experimental tool for the user to perform the practice movement and indicating a position of the specific body part corresponding to the practice movement, within the specific XR image; and
display second visual information indicating an effect of seeing through an internal situation of an organ of the experimental subject on which the practice movement is performed with the experimental tool, within the specific XR image, wherein the processor is further configured to:
when the experimental subject is an actual model, determine the education course of the user by recognizing a type of the actual model of the experimental subject, wherein the processor is further configured to:
when at least one marker located on an experiment table is recognized in the practice image, determine that practice education has started; and
control the display module to display the specific XR image corresponding to the education course of the user, to correspond to a position of the at least one marker, wherein the processor is further configured to:
when at least one object is recognized in the practice image, recognize the practice movement of the user by tracking the recognized object; and
when it is determined, based on the practice image, that the user performs the practice movement of fixing the experimental subject displayed in the specific XR image to the experiment table, control the experimental subject of the XR image to be moved and fixed to the experiment table according to the practice movement of the user, wherein the processor is further configured to:
determine whether the experimental subject is properly fixed on the experiment table, based on a position of a fixing tool in the practice image, wherein the processor is further configured to:
control, based on the practice image, a haptic module to generate a vibration sound indicating a location and intensity of contact of the experimental tool with a specific part of the experimental subject, wherein the processor is further configured to:
when an experimental animal is alive and the experimental tool touches a moving body part of the experimental animal, predict a movement of the experimental subject changed by the location and intensity of the contact of the experimental tool with the experimental subject; and
control the haptic module to generate a vibration sound indicating a practice effect corresponding to the predicted movement, and wherein the processor is further configured to:
when the experimental animal is dead after an initial stage of the animal experiment performed on the experimental animal and no movement is expected in body parts of the experimental animal, or when the body parts of the experimental animal, which are contacted by the experimental tool are motionless parts even if the experimental animal is alive, control the haptic module to stop generating the vibration sound indicating the practice effect.

2. The electronic device of claim 1, wherein the processor is configured to display at least one practice movement to be practiced in the corresponding education course and a corresponding portion of the experimental subject related to the practice movement on the display module.

3. The electronic device of claim 1, further comprising:
a communication part configured to communicate with at least one experimental tool provided with the haptic module that generates vibration sounds.

4. The electronic device of claim 1, wherein the processor is configured to:
render the specific XR image to reflect the predicted movement.

5. The electronic device of claim 1, wherein the processor is configured to calculate a score for order of the practice movement of the user and a score for whether the practice movement of the user is normal on a basis of the reference practice information and the recognized practice movement of the user during the education course.

6. The electronic device of claim 1, wherein the memory is configured to
display precautions corresponding to the recognized practice movement on the display module when the recognized practice movement is not in the normal movement range.

7. A server configured to provide animal experiment practice service by an XR device, the server comprising:
a memory configured to store one or more XR images for virtual practice of an animal experiment, and reference practice information including order of each of practice movements included in each education course for the virtual practice and a normal movement range for each of the practice movements; and
a processor configured to display a specific XR image corresponding to an education course of a user among the one or more XR images on a display module and to recognize a practice movement of the user on a basis of a practice image including the practice movement of the user performed on an experimental subject in the specific XR image when the practice image is received from a camera module, wherein the processor is further configured to:
give and display at least one practice effect corresponding to the recognized practice movement in the specific XR image; and
evaluate a practice education of the user on a basis of the recognized practice movement during the corresponding education course, wherein the specific XR image corresponds to a specific body part of the experimental subject, wherein the processor is further configured to control the display module to:

display first visual information indicating a type of an experimental tool for the user to perform the practice movement and indicating a position of the specific body part corresponding to the practice movement, within the specific XR image; and display second visual information indicating an effect of seeing through an internal situation of an organ of the experimental subject on which the practice movement is performed with the experimental tool, within the specific XR image, wherein the processor is further configured to:

when the experimental subject is an actual model, determine the education course of the user by recognizing a type of the actual model of the experimental subject, wherein the processor is further configured to:

when at least one marker located on an experiment table is recognized in the practice image, determine that practice education has started; and control the display module to display the specific XR image corresponding to the education course of the user, to correspond to a position of the at least one marker, wherein the processor is further configured to:

when at least one object is recognized in the practice image, recognize the practice movement of the user by tracking the recognized object; and when it is determined, based on the practice image, that the user performs the practice movement of fixing the experimental subject displayed in the specific XR image to the experiment table, control the experimental subject of the XR image to be moved and fixed to the experiment table according to the practice movement of the user, wherein the processor is further configured to:

determine whether the experimental subject is properly fixed on the experiment table, based on a position of a fixing tool in the practice image, wherein the processor is further configured to:

control, based on the practice image, a haptic module to generate a vibration sound indicating a location and intensity of contact of the experimental tool with a specific part of the experimental subject, wherein the processor is further configured to:

when an experimental animal is alive and the experimental tool touches a moving body part of the experimental animal, predict a movement of the experimental subject changed by the location and intensity of the contact of the experimental tool with the experimental subject; and control the haptic module to generate a vibration sound indicating a practice effect corresponding to the predicted movement, and wherein the processor is further configured to:

when the experimental animal is dead after an initial stage of the animal experiment performed on the experimental animal and no movement is expected in body parts of the experimental animal, or when the body parts of the experimental animal, which are contacted by the experimental tool are motionless parts even if the experimental animal is alive, control the haptic module to stop generating the vibration sound indicating the practice effect.

8. The server of claim 7, wherein the processor is configured to display at least one practice movement to be practiced in the corresponding education course and a corresponding portion of the experimental subject related to the practice movement on the display module.

9. The server of claim 7, further comprising:

a communication part configured to communicate with at least one experimental tool provided with the haptic module that generates vibration sounds.

10. The server of claim 7, wherein the processor is configured to:

render the specific XR image to reflect the predicted movement.

11. The server of claim 7, wherein the processor is configured to calculate a score for order of the practice movement of the user and a score for whether the practice movement of the user is normal on a basis of the reference practice information and the recognized practice movement of the user during the education course.

12. The server of claim 7, wherein the processor is configured to display precautions corresponding to the recognized practice movement on the display module when the recognized practice movement is not in the normal movement range.

13. A control method of an electronic device as a method performed by a computing device, the control method comprising:

displaying a specific XR image corresponding to an education course of a user on a display module;

receiving a practice image captured to include a practice movement of the user performed on an experimental subject in the specific XR image;

recognizing the practice movement of the user on a basis of the received practice image;

giving and displaying at least one practice effect corresponding to the recognized practice movement in the specific XR image; and evaluating practice education of the user on a basis of the recognized practice movement during the corresponding education course, wherein the computing device stores one or more extended reality images for virtual practice of an animal experiment, and reference practice information including order of each of practice movements included in each education course for the virtual practice and a normal movement range for each of the practice movements, wherein the specific XR image corresponds to a specific body part of the experimental subject, wherein the control method further comprises:

displaying first visual information indicating a type of an experimental tool for the user to perform the practice movement and indicating a position of the specific body part corresponding to the practice movement, within the specific XR image;

displaying second visual information indicating an effect of seeing through an internal situation of an organ of the experimental subject on which the practice movement is performed with the experimental tool, within the specific XR image;

when the experimental subject is an actual model, determining the education course of the user by recognizing a type of the actual model of the experimental subject;

when at least one marker located on an experiment table is recognized in the practice image, determining that practice education has started, and displaying the specific XR image corresponding to the education course of the user, to correspond to a position of the at least one marker;

when at least one object is recognized in the practice image, recognizing the practice movement of the user by tracking the recognized object, and when it is determined, based on the practice image, that the user performs the practice movement of fixing the experimental subject displayed in the specific XR image to the experiment table, controlling the experimental subject of the XR image to be moved and fixed to the experiment table according to the practice movement of the user;

determining whether the experimental subject is properly fixed on the experiment table, based on a position of a fixing tool in the practice image;

controlling, based on the practice image, a haptic module to generate a vibration sound indicating a location and intensity of contact of the experimental tool with a specific part of the experimental subject;

when an experimental animal is alive and the experimental tool touches a moving body part of the experimental animal, predicting a movement of the experimental subject changed by the location and intensity of the contact of the experimental tool with the experimental subject, and controlling the haptic module to generate a vibration sound indicating a practice effect corresponding to the predicted movement; and when the experimental animal is dead after an initial stage of the animal experiment performed on the experimental animal and no movement is expected in body parts of the experimental animal, or when the body parts of the experimental animal, which are contacted by the experimental tool are motionless parts even if the experimental animal is alive, controlling the haptic module to stop generating the vibration sound indicating the practice effect.

* * * * *